United States Patent
Wu (10) Patent No.: US 11,409,584 B2
(45) Date of Patent: Aug. 9, 2022

(54) CROSS-APPLICATION DATA SHARING

(71) Applicant: Advanced New Technologies Co., Ltd., George Town (KY)

(72) Inventor: Jianlei Wu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/216,970

(22) Filed: Dec. 11, 2018

(65) Prior Publication Data

US 2019/0114216 A1 Apr. 18, 2019

Related U.S. Application Data

(63) Continuation of application No. PCT/CN2017/086819, filed on Jun. 1, 2017.

(30) Foreign Application Priority Data

Jun. 12, 2016 (CN) .......................... 201610407818.4

(51) Int. Cl.
*G06F 9/54* (2006.01)
*G06F 16/958* (2019.01)
*G06F 16/953* (2019.01)

(52) U.S. Cl.
CPC .............. *G06F 9/544* (2013.01); *G06F 9/541* (2013.01); *G06F 9/546* (2013.01); *G06F 16/953* (2019.01); *G06F 16/958* (2019.01)

(58) Field of Classification Search
None
See application file for complete search history.

(56) References Cited

U.S. PATENT DOCUMENTS 6,366,912 B1 * 4/2002 Wallent .................... G06F 21/51
7,379,980 B1 * 5/2008 Gilbert .................. H04L 63/061
707/999.01

(Continued)

FOREIGN PATENT DOCUMENTS

CN 1261699 8/2000
CN 103179134 6/2013

(Continued)

OTHER PUBLICATIONS

International Search Report by the International Searching Authority issued in International Application No. PCT/CN2017/086819 dated Aug. 25, 2017; 9 pages.

(Continued)

*Primary Examiner* — Chat C Do
*Assistant Examiner* — William C Wood
(74) *Attorney, Agent, or Firm* — Fish & Richardson P.C.

(57) ABSTRACT

A data writing request is received at a web browser from a first application, where the data writing request comprises data and address information of a web page into which the data is written, and where the web browser and the first application are associated with a mobile device. The data writing request is sent to a web server. An instruction message is received from the web server and the data is stored at a shared storage space on the mobile device based on the instruction message. A data access request is received from a second application, where the web browser and the second application are associated with the mobile device. The data is read from the shared storage space based on the access request and sent to the second application.

14 Claims, 5 Drawing Sheets

(56) References Cited

U.S. PATENT DOCUMENTS

| | | | | |
|---|---|---|---|---|
| 7,877,461 | B1* | 1/2011 | Rimmer | H04L 63/0823 709/217 |
| 9,288,118 | B1* | 3/2016 | Pattan | H04L 67/306 |
| 2005/0203909 | A1* | 9/2005 | Zhao | G06F 16/9535 |
| 2005/0204041 | A1* | 9/2005 | Blinn | H04L 63/0815 709/225 |
| 2006/0031771 | A1 | 2/2006 | MacHeffner | |
| 2010/0122271 | A1* | 5/2010 | Labour | G06F 16/95 719/328 |
| 2014/0229920 | A1* | 8/2014 | Rossi | G06F 11/3664 717/125 |
| 2015/0052599 | A1 | 2/2015 | Champagne et al. | |
| 2015/0227736 | A1* | 8/2015 | Guo | G06F 21/6281 726/29 |
| 2015/0339176 | A1 | 11/2015 | Messerly et al. | |

FOREIGN PATENT DOCUMENTS

| | | |
|---|---|---|
| CN | 103795767 | 5/2014 |
| CN | 103888540 | 6/2014 |
| CN | 103955477 | 7/2014 |
| CN | 104320423 | 1/2015 |
| CN | 104376123 | 2/2015 |
| CN | 104392008 | 3/2015 |
| CN | 104978378 | 10/2015 |
| CN | 105592424 | 5/2016 |
| JP | 2006190008 | 7/2006 |
| JP | 2013222440 | 10/2013 |
| KR | 20130143613 | 12/2013 |

OTHER PUBLICATIONS

European Extended Search Report in European Patent Application No. 17812559.7, dated May 8, 2019, 7 pages.

Staten, branch.io [online], "100% Matching Accuracy with iOS 9 Safari View Controller," Sep. 2015, [retrieved on Apr. 24, 2019], retrieved from: URL <https://blog.branch.io/install-attribution-ios-9-safari-view-controller/>, 5 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Preliminary Report on Patentability in International Application No. PCT/CN2017/086819 dated Dec. 18, 2018; 10 pages.

Cnblogs.com [online], "iOS 9—SFSafariViewController," Mar. 2016, [Retrieved on Feb. 3, 2020], retrieved from: URL <https://www.cnblogs.com/rongcheng/p/5235029.html>, 5 pages (with Machine Translation).

Cnblogs.com [online], "iOS Development: WebKit, Safari and SafariViewController-ios Development Group 529052159," Feb. 2016, [Retrieved on Feb. 3, 2020], retireved from: URL <https://www.cnblogs.com/leixu/tag/Webkit%E3%80%81Safari%E4%BB%A5%E5%8F%8ASafariViewController/>, 14 pages (with Machine Translation).

Stockflow.com [online], "ios—SFSafariViewController—Interacting with the parent app from a web-page—Stack Overflow", Feb. 2, 2016, retrieved on Sep. 29, 2020, retrieved from URL: <https://stackoverflow.com/questions/35164505/sfsafariviewcontroller-interacting-with-the-parent-app-from-a-web-page>, 2 pages.

Developer.apple.com [online], "SFSafariViewController I Apple Developer Documentation", retreived on Oct. 8, 2020, retrieved from URL: <https://developer.apple.com/documentation/safariservices/ sfsafariviewcontroller>, 3 pages.

Ma et al., "Network Engineering," 1st ed., Beijing University of Posts and Telecommunications Press Co. Ltd., Sep. 2013, pp. 242-244 (with English abstract).

* cited by examiner

CROSS-APPLICATION DATA SHARING

CROSS-REFERENCE TO RELATED APPLICATIONS

This application is a continuation of PCT Application No. PCT/CN2017/086819, filed on Jun. 1, 2017, which claims priority to Chinese Patent Application No. 201610407818.4, filed on Jun. 12, 2016, and each application is hereby incorporated by reference in its entirety.

TECHNICAL FIELD

The present application relates to the field of data sharing technologies, and in particular, to a cross-application data sharing method and a web browser.

BACKGROUND

In conventional technologies, data can be shared only between applications that are considered to be in the same group on a mobile device. For example, a plurality of applications (such as WeChat and QQ) of the same developer are divided into one group on a mobile device using the iOS operating system, and data can be shared only between the plurality of applications. In other words, data sharing applications are limited in the conventional technologies. Therefore, a cross-application data sharing method needs to be provided, to implement data sharing between any two applications on the same mobile device.

SUMMARY

The present application describes a cross-application data sharing method and a web browser, to implement data sharing between any two applications on the same mobile device.

A first aspect provides a cross-application data sharing method, and the method includes: receiving, by a web server, a data writing request sent by a first application using a web browser of a mobile device that the first application is located on, where the data writing request includes address information of a web page that data is to be written to and the data to be written; writing the data to the web page corresponding to the address information, and instructing the web browser to store the data in shared storage space corresponding to the web page on the mobile device; receiving an access request for accessing the web page that is sent by a second application on the mobile device by using the web browser; and reading the data from the shared storage space based on the access request, and sending the data to the second application.

A second aspect provides a web browser, and the web browser includes: a receiving unit, configured to receive a data writing request sent by a first application located on the same mobile device as the web browser, where the data writing request includes address information of a web page that data is to be written to and the data to be written; a sending unit, configured to send the data writing request received by the receiving unit to a web server, where the receiving unit is further configured to receive an instruction message sent after the web server generates the web page corresponding to the address information on the web browser based on the data writing request and writes the data to the web page; a storage unit, configured to store the data in shared storage space corresponding to the web page on the mobile device based on the instruction message received by the receiving unit, where the receiving unit is further configured to receive an access request for accessing the web page that is sent by a second application on the mobile device; and a read unit, configured to read the data from the shared storage space based on the access request received by the receiving unit, where the sending unit is further configured to send the data read by the read unit to the second application.

According to the cross-application data sharing method and the web browser provided in the present application, when the first application accesses the web page by using the web browser of the mobile device that the first application is located on and writes data to the web page, the web server instructs the web browser to store the data in the shared storage space corresponding to the web page on the mobile device; and when the second application on the mobile device accesses the web page by using the web browser, the web browser can read the data from the shared storage space and send the data to the second application, thereby conveniently implementing data sharing between any two applications on the same mobile device.

BRIEF DESCRIPTION OF DRAWINGS

To describe the technical solutions in the implementations of the present disclosure more clearly, the following briefly introduces the accompanying drawings needed for describing the implementations. Apparently, the accompanying drawings in the following description show merely some implementations of the present disclosure, and a person of ordinary skill in the art can still derive other drawings from these accompanying drawings without creative efforts.

DESCRIPTION OF IMPLEMENTATIONS

The following describes implementations of the present disclosure with reference to accompanying drawings.

A cross-application data sharing method provided in the implementations of the present application is applicable to data sharing between any two applications on the same mobile device. The mobile device here includes but is not limited to a mobile phone, a mobile computer, a tablet computer, a personal digital assistant (PDA), etc., and the mobile device can use the operating system iOS 9.0 or later. In addition, shared data can include login authentication information (such as a user name or user ID), shared application\data, etc.

Figure 1:
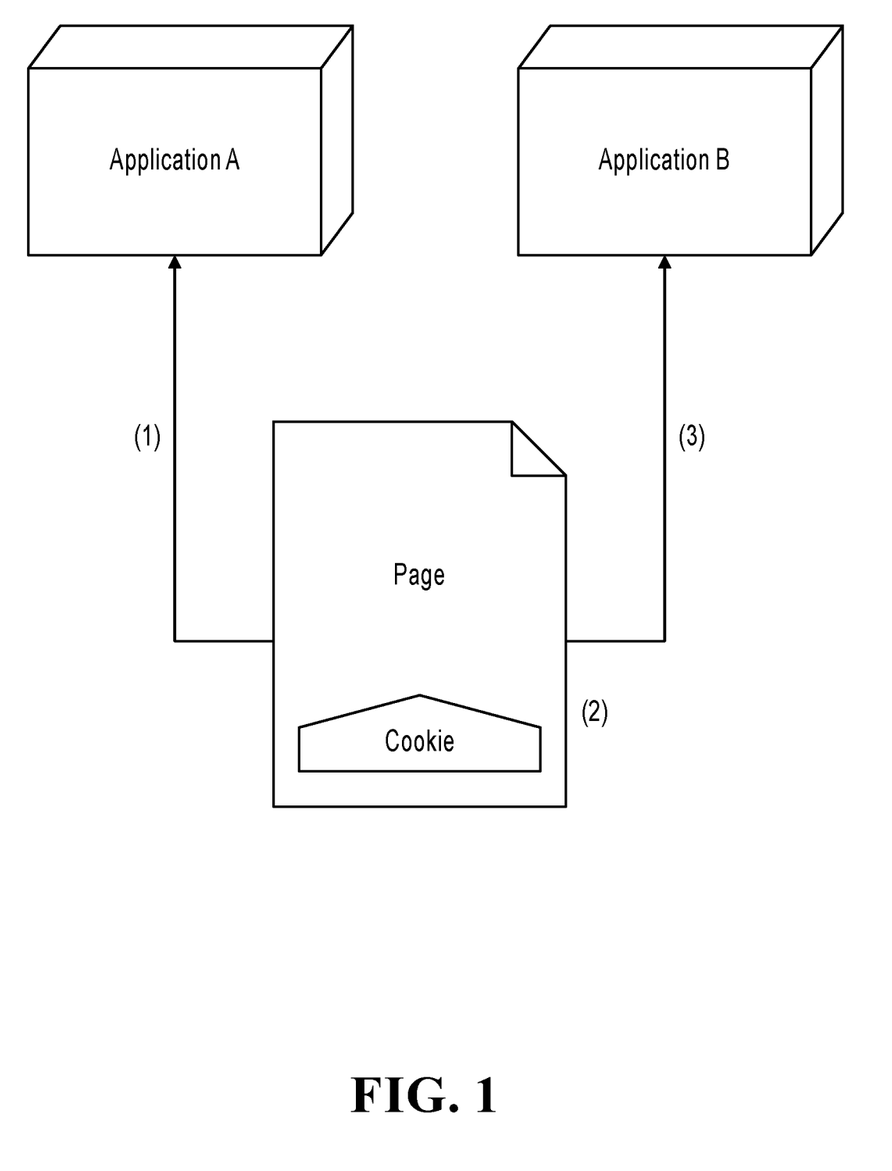
FIG. 1 is a schematic diagram illustrating an application scenario of a cross-application data sharing method, according to the present application.

FIG. 1 is a schematic diagram illustrating an application scenario of a cross-application data sharing method, according to the present application. In FIG. 1, application A is referred to as a first application that writes data to a web page, and application B is referred to as a second application that reads the data from the web page. In FIG. 1, application A and application B are installed on the same mobile device, and the mobile device has a built-in web browser (for example, Safari). It is worthwhile to note that, when application A accesses a web page by using the built-in web browser of the mobile device that application A is located on and writes data to the web page, the web browser stores the written data in shared storage space corresponding to the web page on the mobile device; and when another application (for example, application B) accesses the web page by using the built-in web browser of the mobile device, the web browser can directly read the data from the shared storage space corresponding to the web page, and send the read data to application B, thereby implementing data sharing between any two applications on the same mobile device.

As illustrative descriptions, FIG. 1 provides only a method for sharing data between two applications. In practice, when another application (for example, application C) on the mobile device accesses the previous web page by using the built-in web browser of the mobile device, the web browser can also read the data from the shared storage space. In other words, data can be shared between a plurality of applications. Implementations are not limited in the present application.

Figure 2:
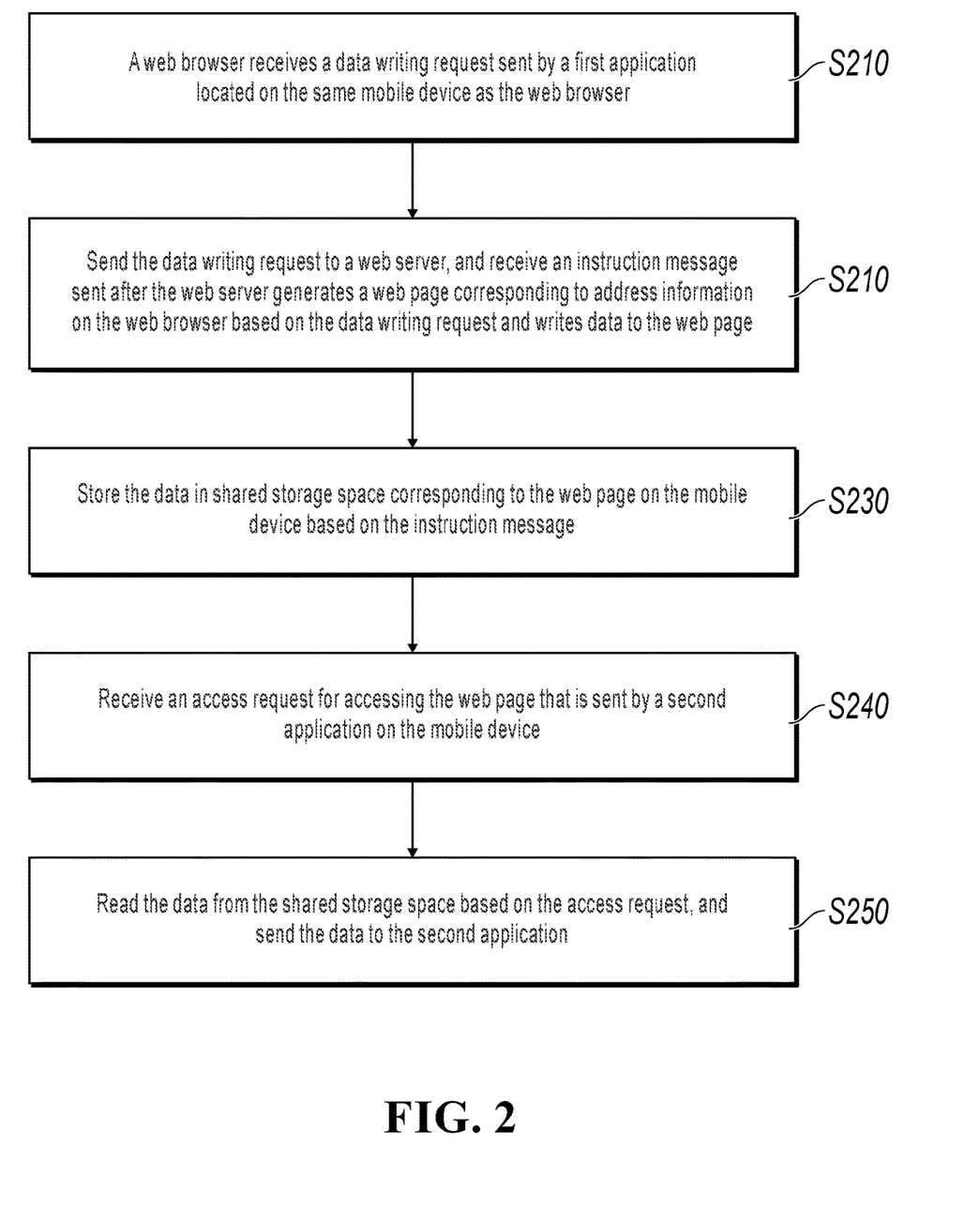
FIG. 2 is a flowchart illustrating a cross-application data sharing method, according to an implementation of the present application.

FIG. 2 is a flowchart illustrating a cross-application data sharing method, according to an implementation of the present application. The method can be executed by a web browser. As shown in FIG. 2, the method can include the following steps.

Step 210: A web browser receives a data writing request sent by a first application located on the same mobile device as the web browser.

The data writing request can include address information (such as a uniform resource locator (URL)) of a web page that data is to be written to and the data to be written. The first application and the web browser are installed on the same mobile device. For example, the address information of the web page that the data is to be written to can be http://host.name/path/to/page.

Optionally, the first application can send the data writing request to the web browser by instantiating a web controller (SFSafariViewController) SafariViewController) class. The SFSafariViewController class is a class provided by the operating system iOS 9.0 or later, and can provide a plurality of applications with high-level sharing functions (such as shared content interception and password input).

In a specific implementation, for the web page in the previous example, the first application can instantiate the SFSafariViewController class by using the following code:

using Safari Services;
. . .
var vc = new SFSafariViewController ("http://host.name/path/to/page");
PresentViewControllerAsync (vc, true).

After the previous code is run, the first application can send the data writing request to the web browser of the mobile device that the first application is located on.

Step 220: Send the data writing request to a web server, and receive an instruction message sent after the web server generates a web page corresponding to address information on the web browser based on the data writing request and writes data to the web page.

The web browser can send the data writing request to the web server after receiving the data writing request sent by the first application, so that the web server generates, through rendering in the web browser based on the address information in the data writing request of the web page that the data is to be written to, and writes the data to the web page. The web server can send the instruction message to the web browser after the web server writes the data to the web page.

Step 230: Store the data in shared storage space corresponding to the web page on the mobile device based on the instruction message.

The web browser can store the previously described data in the shared storage space corresponding to the web page on the mobile device based on the received instruction message. For example, the shared storage space here can be a cookie entry generated by the web server in advance on the mobile device, and a location of the cookie entry is in a root directory by default.

Optionally, when the shared storage space is the cookie entry, this implementation of the present application can further include steps of determining cookie entries. After receiving the instruction message, the web browser can parse the address information of the web page to obtain a domain name of the web page. For example, after address information "http://host.name/path/to/page" of the web page in the previous example is parsed, the obtained domain name of the web page is "host.name". Here, obtaining the domain name of the web page from the address information of the web page is a conventional common technology. Details are omitted here in the present application. After the domain name of the web page is obtained, the corresponding cookie entry can be determined based on the domain name of the web page, and the data can be written to the cookie entry.

Certainly, in practice, there can be a plurality of cookie entries generated by the web server in advance on the mobile device. In other words, when a plurality of cookie entries can be determined based on the domain name of the web page, the plurality of cookie entries can be stored in a key-value pair form. To be specific, the web server assigns a unique name (key) to each cookie entry, and the plurality of cookie entries can be arranged in a specific order. Then, when the web browser requests the web server, the web server can instruct the web browser to write data to a cookie entry. In other words, when sending the instruction message, the web server indicates a key of a cookie entry to be currently written by the web browser, and the web browser writes the data to the cookie entry corresponding to the key. It can be understood that after the data is written, the web server can send the key of the cookie entry including the written data to an object (for example, application A) writing the data to the web page.

FIG. 1 is used as an example. Assume that the data written by application A to the web page is stored in a plurality of cookie entries. Application A can obtain keys of the plurality of cookie entries through interaction with the web server. However, when application A and application B need to share data, application A and application B can use a key that both of them agree to, to obtain data in the same cookie entry.

Step 240: Receive an access request for accessing the web page that is sent by a second application on the mobile device.

The access request here can be a data read request, and the access request can include the address information of the web page. The second application here can be any application on the mobile device except the first application.

Step 250: Read the data from the shared storage space based on the access request, and send the data to the second application.

When the second application accesses the web page by using the web browser on the mobile device, that is, when the web browser receives the access request for accessing the web page that is sent by the second application, the web browser can parse the address information in the access request to obtain the domain name of the web page; then search the mobile device for the cookie entry corresponding to the web page based on the domain name of the web page, and read the data from the cookie entry; and finally send the read data to the second application, thereby implementing data sharing between different applications on the same mobile device.

It is worthwhile to note that a method for sending the access request to the web browser by the second application is the same as a method for sending the data writing request to the web browser by the first application. Details are omitted here for simplicity.

It can be understood that, when there are a plurality of cookie entries corresponding to the web page of the mobile device, that is, when a plurality of cookie entries can be determined based on the domain name of the web page, if the second application needs to read data from a part of cookie entries, the second application can determine keys of the part of cookie entries by using a name agreed with the first application; then search for the part of cookie entries based on the determined keys and read data from the cookie entries; or can negotiate a sequence of reading the part of cookie entries (for example, agree to always read data in the first cookie entry).

When the second application reads the cookie entry by using the name (key) of the cookie, the implementation code can be as follows:

```
function getCookie(name) {
var allCookies = ";" + document.cookie;
var parts = allCookies.split(";" + name + "=");
if (parts.length = 2) return parts.pop( ).split(";").shift( );
}
getCookie("key").
```

It is worthwhile to note that in conventional technologies, the first application usually directly opens a web page to be accessed, instead of accessing the web page by using the web browser of the mobile device that the first application is located on. When the first application directly opens the web page to be accessed, if the first application writes data to the web page, the web server instructs the first application to record the written data to virtual storage space (such as a sandbox) corresponding to the first application. Other applications cannot directly read data in the virtual storage space, and instead, the first application needs to read the data when visiting the web page at a next time. In other words, data cannot be shared between applications. In the present application, the first application accesses the web page by using the web browser, so that when the first application writes data to the web page, the web server instructs the web browser to store the data in storage space that the web browser can read/write data. When another application accesses the web page by using the web browser, the web browser can directly read the stored data from the previous storage space, and send the data to the second application, thereby implementing data sharing between any two applications on the same mobile device.

Figure 3:
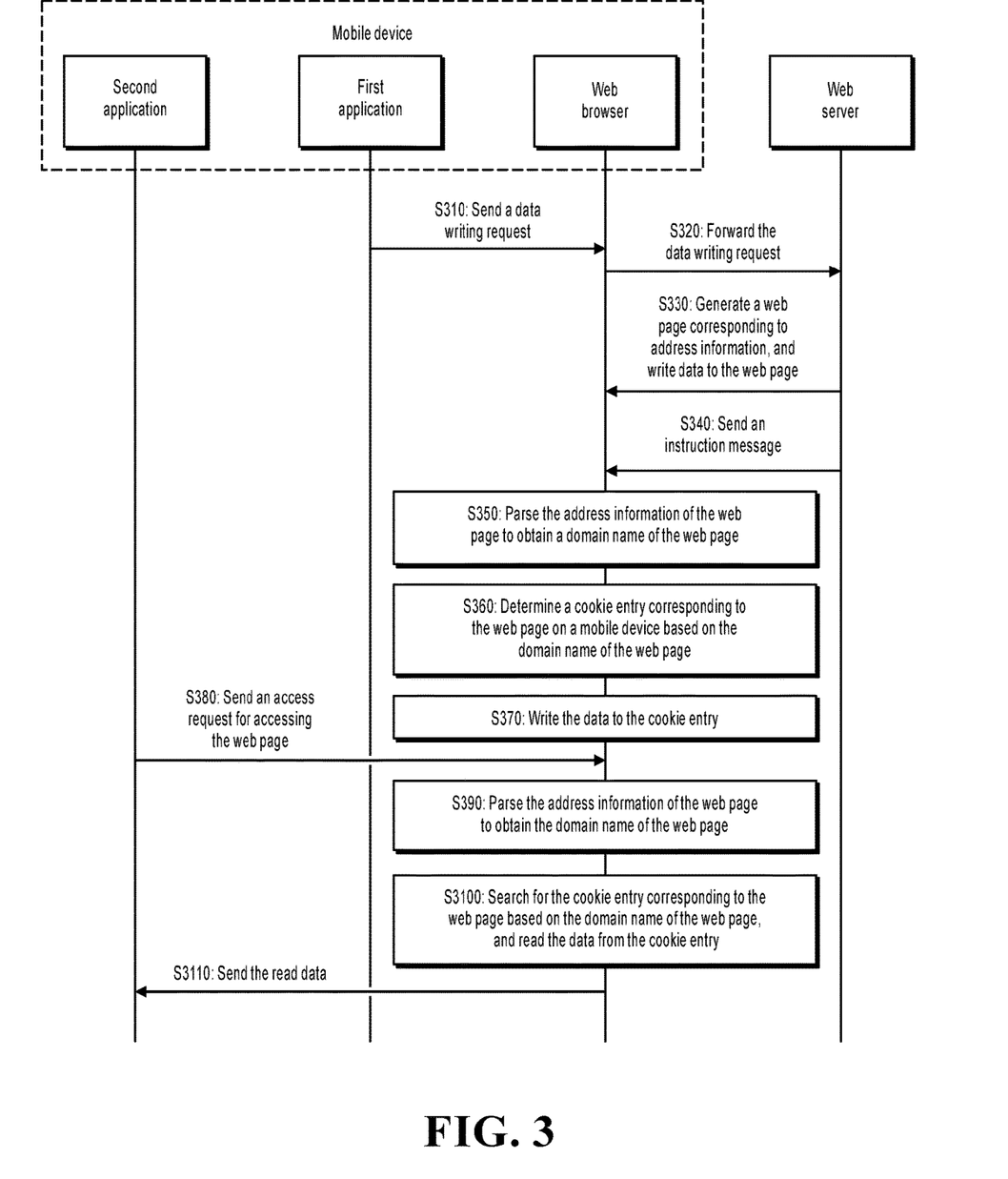
FIG. 3 is a schematic interaction diagram illustrating a cross-application data sharing method, according to another implementation of the present application.

FIG. 3 is a schematic interaction diagram illustrating a cross-application data sharing method, according to another implementation of the present application. As shown in FIG. 3, the method can include the following steps.

Step 310: A first application sends a data writing request to a web browser.

The data writing request includes address information of a web page that data is to be written to and the data to be written.

Step 320: The web browser forwards the data writing request to a web server.

Step 330: The web server generates a web page corresponding to address information on the web browser, and writes data to the web page.

Step 340: The web server sends an instruction message to the web browser.

Step 350: The web browser parses the address information of the web page to obtain a domain name of the web page.

Step 360: The web browser determines a cookie entry corresponding to the web page on the mobile device based on the domain name of the web page.

Step 370: The web browser writes the data to the cookie entry.

Step 380: A second application sends an access request for accessing the web page to the web browser.

The access request includes the address information of the web page.

Step 390: The web browser parses the address information of the web page to obtain the domain name of the web page.

Step 3100: The web browser searches the mobile device for the cookie entry corresponding to the web page based on the domain name of the web page, and reads the data from the cookie entry.

Step 3110: The web browser sends the data to the second application.

It is worthwhile to note that, after step 380 and before step 390, the web browser can forward the access request to the web server, so that the web server generates the web page on the web browser through rendering.

According to the cross-application data sharing method provided in the present application, when the first application accesses the web page by using the web browser of the mobile device that the first application is located on and writes data to the web page, the web server instructs the web browser to store the data in shared storage space corresponding to the web page on the mobile device; and when the second application on the mobile device accesses the web page by using the web browser, the web browser can read the data from the shared storage space and send the data to the second application, thereby conveniently implementing data sharing between any two applications on the same mobile device.

Figure 4:
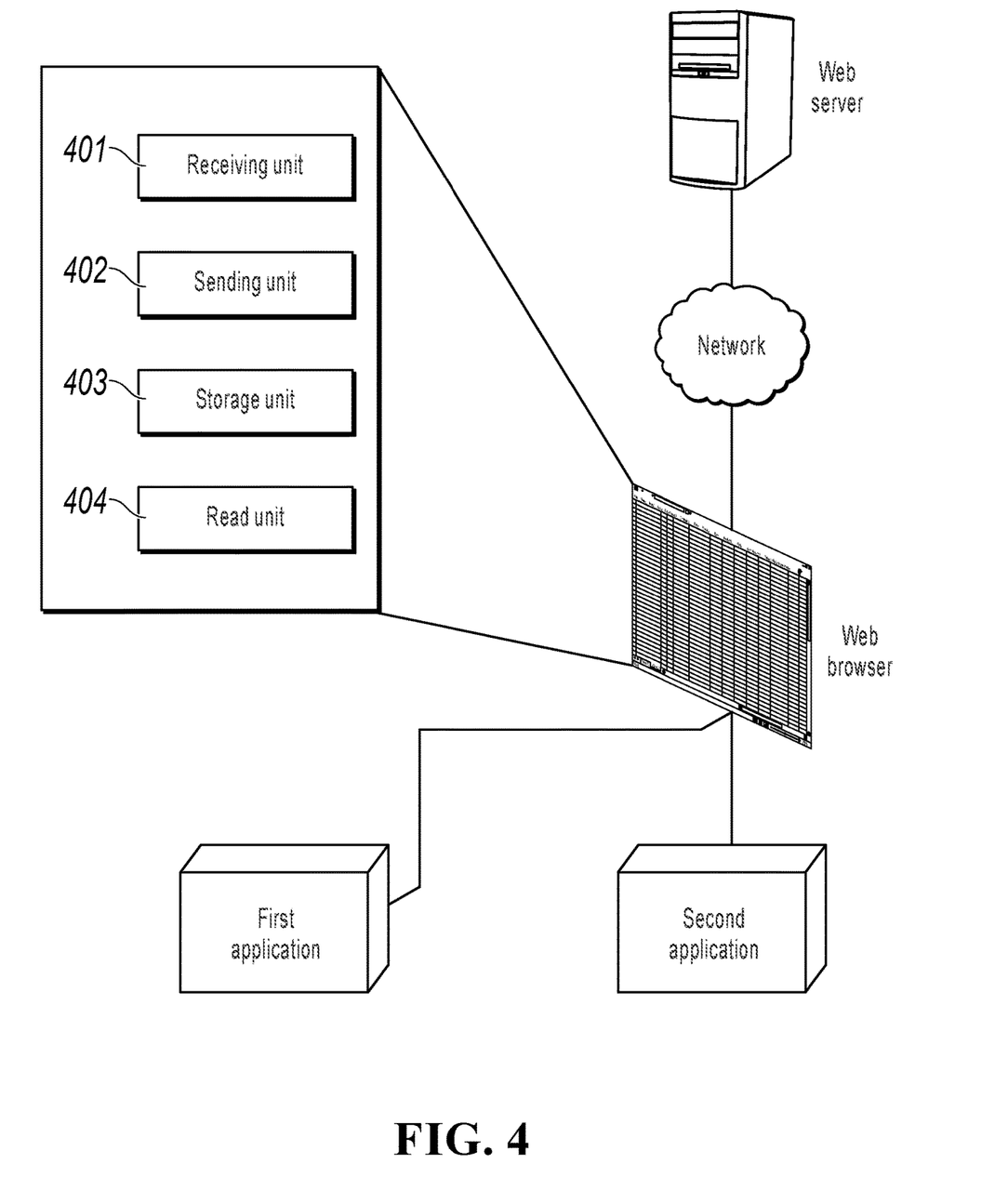
FIG. 4 is a schematic diagram illustrating a web browser, according to still another implementation of the present application.

Corresponding to the previous cross-application data sharing method, an implementation of the present application further provides a web browser. As shown in FIG. 4, the web browser includes:

A receiving unit 401 that is configured to receive a data writing request sent by a first application located on the same mobile device as the web browser, where the data writing request includes address information of a web page that data is to be written to and the data to be written.

The first application can send the data writing request to the web browser by instantiating a web controller SF SafariViewController class.

A sending unit 402 that is configured to send the data writing request received by the receiving unit 401 to a web server.

The receiving unit 401 is further configured to receive an instruction message sent after the web server generates the web page corresponding to the address information on the web browser based on the data writing request, and writes the data to the web page.

A storage unit 403 that is configured to store the data in shared storage space corresponding to the web page on the mobile device based on the instruction message received by the receiving unit 401.

The receiving unit 401 is further configured to receive an access request for accessing the web page that is sent by a second application on the mobile device.

A read unit 404 that is configured to read the data from the shared storage space based on the access request received by the receiving unit 401.

The sending unit 402 is further configured to send the data read by the read unit 404 to the second application.

Optionally, the web browser can further include a parsing unit 405, configured to parse the address information of the web page to obtain a domain name of the web page; and a determining unit 406, configured to determine the shared storage space corresponding to the web page on the mobile device based on the domain name obtained by the parsing unit 405.

The determining unit 406 is configured to determine a cookie entry corresponding to the web page on the mobile device based on the domain name.

The storage unit 403 is configured to store the data in the cookie entry.

Optionally, the access request includes the address information.

The read unit 404 is configured to parse the address information to obtain the domain name of the web page; search the mobile device for the cookie entry corresponding to the web page based on the domain name of the web page; and read the data from the cookie entry.

Functions of function modules of the device in this implementation of the present application can be implemented by performing the steps in the previous method implementation. A specific working process of the device provided in the present application is omitted here.

According to the web browser provided in the present application, the receiving unit 401 receives the data writing request sent by the first application located on the same mobile device as the web browser, where the data writing request includes the address information of the web page that the data is to be written to and the data to be written; the sending unit 402 sends the data writing request to the web server; the receiving unit 401 receives the instruction message sent after the web server generates the web page corresponding to the address information on the web browser based on the data writing request, and writes the data to the web page; the storage unit 403 stores the data in the shared storage space corresponding to the web page on the mobile device based on the instruction message; the receiving unit 401 receives the access request for accessing the web page that is sent by the second application on the mobile device; the read unit 404 reads the data from the shared storage space based on the access request; and the sending unit 402 sends the data to the second application, thereby conveniently implementing data sharing between any two applications on the same mobile device.

A person skilled in the art should be aware that in the previous one or more examples, functions described in the present disclosure can be implemented by hardware, software, firmware, or any combination thereof. When the present disclosure is implemented by software, the functions can be stored in a computer readable medium or transmitted as one or more instructions or code in the computer readable medium.

The objectives, technical solutions, and benefits of the present disclosure are further described in detail in the earlier-described specific implementations. It should be understood that the earlier-described descriptions are merely specific implementations of the present disclosure, but are not intended to limit the protection scope of the present disclosure. Any modification, equivalent replacement, or improvement made within the spirit and principle of the present disclosure shall fall within the protection scope of the present disclosure.

Figure 5:
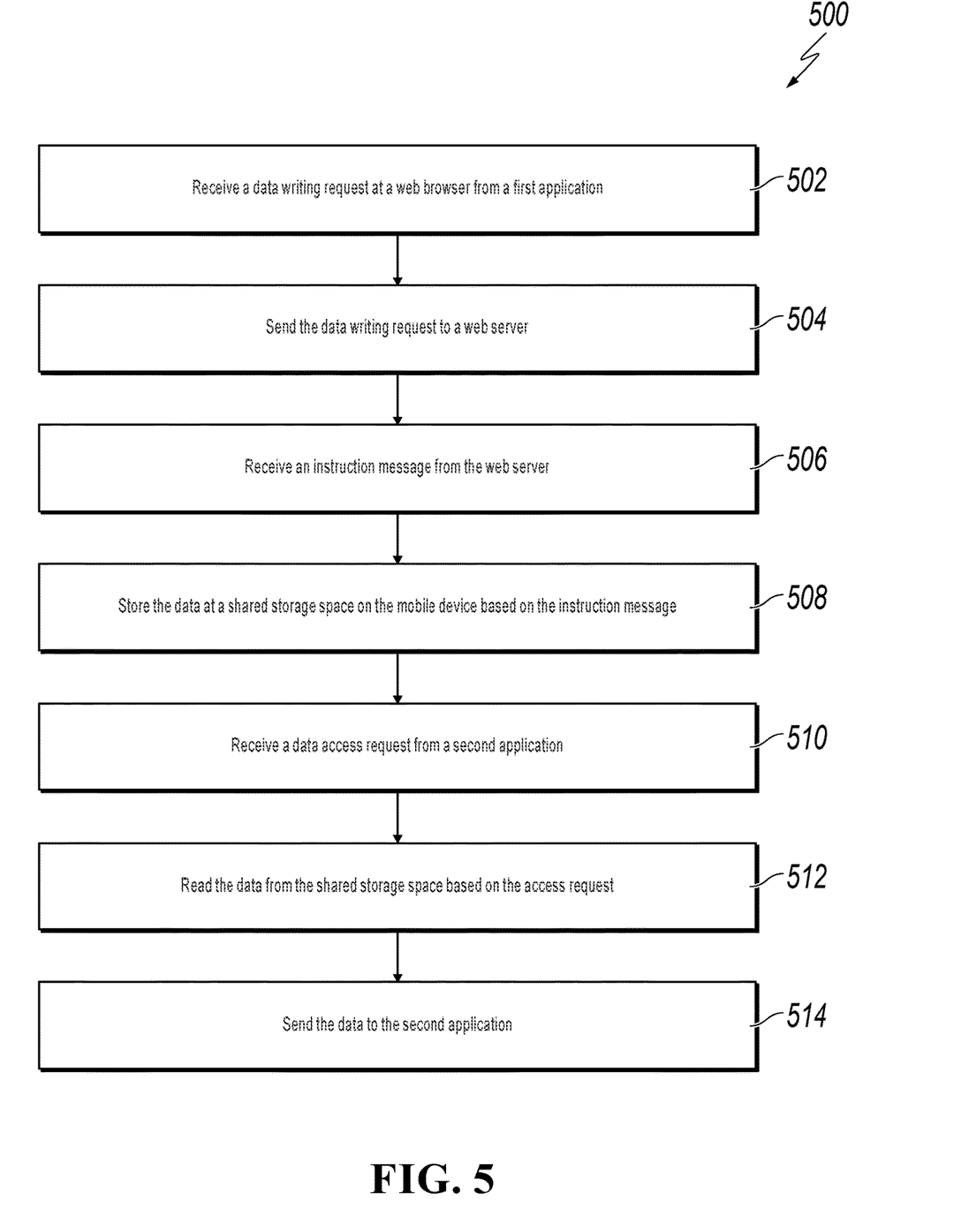
FIG. 5 is a flowchart illustrating an example of a computer-implemented method for sharing data between applications installed on a mobile device, according to an implementation of the present disclosure.

FIG. 5 is a flowchart illustrating an example of a computer-implemented method 500 for sharing data between applications installed on a mobile device, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, at a web browser, a data writing request is received from a first application, where the data writing request includes data and address information of a web page into which the data is written, and where the web browser and the first application are associated with the same mobile device. In some implementations, the data writing request is sent to the web browser by the first application instantiating a web controller class. From 502, method 500 proceeds to 504.

At 504, the data writing request is sent to a web server. In some implementations, the method 500 further includes: determining, by the web server, a number of cookie entries based on a domain name of the web page; assigning, a unique key to each cookie entry so that the cookie entries are stored in a key-value pair form; receiving, a data writing request from the web browser; and instructing, the web browser to write data to a cookie entry by indicating a key of a cookie entry to be written. From 504, method 500 proceeds to 506.

At 506, an instruction message is received from the web server. From 506, method 500 proceeds to 508.

At 508, the data is stored at a shared storage space on the mobile device based on the instruction message. In some implementations, the shared storage space is a cookie entry on the mobile device that is generated by the web server. In some implementations, storing the data at a shared storage space on the mobile device includes: sending, from the web browser, the data writing request to a web server so that the web server writes the data into the web page corresponding to the address information of the web page, wherein the web page is generated by the web server; receiving, an instruction message from the web server; parsing, the address information of the web page to obtain a domain name of the web page; determining, a cookie entry corresponding to the web page on the mobile device based on the domain name of the web page; and writing the data to the cookie entry. From 508, method 500 proceeds to 510.

At 510, a data access request is received from a second application, where the web browser and the second application are associated with the same mobile device. In some implementations, the data access request includes the address information of the web page. From 510, method 500 proceeds to 512.

At 512, the data is read from the shared storage space based on the access request. In some implementations, reading the data from the shared storage space includes: parsing, the address information of the web page to obtain a domain name of the web page; searching, the mobile device for a cookie entry corresponding to the web page based on the domain name of the web page; and reading the data from the cookie entry. From 512, method 500 proceeds to 514.

At 514, the data is sent to the second application. After 514, method 500 can stop.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for cross-application data sharing, the computer-implemented method comprising:
   receiving, by a web browser from a first application, a data writing request, wherein the data writing request comprises data and address information of a web page into which the data is to be written, and wherein the first application is included in a set of applications located on a mobile device, on which the web browser is also located, wherein the data writing request is sent to the web browser by the first application instantiating a web controller class to provide the set of applications with high-level sharing functions comprising shared content interception and password input;
   sending, by the web browser, the data writing request to a web server, and, in response, rendering, by the web browser and as a rendered web page, a web page that comprises the data;
   receiving an instruction message from the web server, the instruction message being indicative of a key, wherein the key is based on a pre-determined name used by the first application and a second application to obtain the data, and wherein the second application is included in the set of applications;
   storing, on the mobile device and by the web browser, the data included on the rendered web page at a shared storage space that corresponds to the rendered web page on the mobile device based on the instruction message, the data comprising the key, wherein the shared storage space is accessible by each application in the set of applications by using the web controller class;
   receiving, by the web browser, a data access request from a second application, wherein the web browser and the second application are associated with the mobile device;
   reading, by the web browser, the data included on the rendered web page from the shared storage space that corresponds to the rendered web page based on the data access request wherein the data access request comprises the address information of the web page;
   parsing the address information to obtain a domain name of the web page;
   searching the mobile device for the data corresponding to the domain name of the web page and the key;
   reading the data from the shared storage space corresponding to the web page on the mobile device based on the data access request; and
   sending, by the web browser, the data to the second application.

2. The computer-implemented method of claim 1, wherein the shared storage space is a cookie entry on the mobile device that is generated by the web server.

3. The computer-implemented method of claim 1, wherein storing the data at the shared storage space on the mobile device comprises:
   sending, from the web browser, the data writing request to the web server so that the web server writes the data into the web page corresponding to the address information of the web page, wherein the web page is generated by the web server;
   receiving an instruction message from the web server;
   parsing the address information of the web page to obtain a domain name of the web page;
   determining a cookie entry corresponding to the web page on the mobile device based on the domain name of the web page; and
   writing the data to the cookie entry.

4. The computer-implemented method of claim 1, further comprising:
   determining, by the web server, a plurality of cookie entries based on a domain name of the web page;
   assigning a unique key to each cookie entry so that the cookie entries are stored in a key-value pair form;
   receiving a data writing request from the web browser; and
   instructing the web browser to write data to a cookie entry by indicating a key of a cookie entry to be written.

5. A non-transitory, computer-readable medium storing one or more instructions executable by a computer system to perform operations comprising:
   receiving, by a web browser from a first application, a data writing request, wherein the data writing request comprises data and address information of a web page into which the data is to be written, and wherein the first application is included in a set of applications located on a mobile device, on which the web browser is also located, wherein the data writing request is sent to the web browser by the first application instantiating a web controller class to provide the set of applications with high-level sharing functions comprising shared content interception and password input;
   sending, by the web browser, the data writing request to a web server, and, in response, rendering, by the web browser and as a rendered web page, a web page that comprises the data;
   receiving an instruction message from the web server, the instruction message being indicative of a key, wherein the key is based on a pre-determined name used by the first application and a second application to obtain the data, and wherein the second application is included in the set of applications;

storing, on the mobile device and by the web browser, the data included on the rendered web page at a shared storage space that corresponds to the rendered web page on the mobile device based on the instruction message, the data comprising the key, wherein the shared storage space is accessible by each application in the set of applications by using the web controller class;

receiving, by the web browser, a data access request from a second application, wherein the web browser and the second application are associated with the mobile device;

reading, by the web browser, the data included on the rendered web page from the shared storage space that corresponds to the rendered web page based on the data access request wherein the data access request comprises the address information of the web page;

parsing the address information to obtain a domain name of the web page;

searching the mobile device for the data corresponding to the domain name of the web page and the key;

reading the data from the shared storage space corresponding to the web page on the mobile device based on the data access request; and sending, by the web browser, the data to the second application.

6. The non-transitory, computer-readable medium of claim 5, wherein the shared storage space is a cookie entry on the mobile device that is generated by the web server.

7. The non-transitory, computer-readable medium of claim 5, wherein storing the data at the shared storage space on the mobile device comprises one or more instructions to:
    send, from the web browser, the data writing request to the web server so that the web server writes the data into the web page corresponding to the address information of the web page, wherein the web page is generated by the web server;
    receive an instruction message from the web server;
    parse the address information of the web page to obtain a domain name of the web page;
    determine a cookie entry corresponding to the web page on the mobile device based on the domain name of the web page; and
    write the data to the cookie entry.

8. The non-transitory, computer-readable medium of claim 5, wherein reading the data from the shared storage space comprises one or more instructions to:
    parse the address information of the web page to obtain a domain name of the web page;
    search the mobile device for a cookie entry corresponding to the web page based on the domain name of the web page; and
    read the data from the cookie entry.

9. The non-transitory, computer-readable medium of claim 5, further comprising one or more instructions to:
    determine, by the web server, a plurality of cookie entries based on a domain name of the web page;
    assign a unique key to each cookie entry so that the cookie entries are stored in a key-value pair form;
    receive a data writing request from the web browser; and
    instruct the web browser to write data to a cookie entry by indicating a key of a cookie entry to be written.

10. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
        receiving, by a web browser from a first application, a data writing request, wherein the data writing request comprises data and address information of a web page into which the data is to be written, and wherein the first application is included in a set of applications located on a mobile device, on which the web browser is also located, wherein the data writing request is sent to the web browser by the first application instantiating a web controller class to provide the set of applications with high-level sharing functions comprising shared content interception and password input;
        sending, by the web browser, the data writing request to a web server, and, in response, rendering, by the web browser and as a rendered web page, a web page that comprises the data;
        receiving an instruction message from the web server, the instruction message being indicative of a key, wherein the key is based on a pre-determined name used by the first application and a second application to obtain the data, and wherein the second application is included in the set of applications;
        storing, on the mobile device and by the web browser, the data included on the rendered web page at a shared storage space that corresponds to the rendered web page on the mobile device based on the instruction message, the data comprising the key, wherein the shared storage space is accessible by each application in the set of applications by using the web controller class;
        receiving, by the web browser, a data access request from a second application, wherein the web browser and the second application are associated with the mobile device;
        reading, by the web browser, the data included on the rendered web page from the shared storage space that corresponds to the rendered web page based on the data access request wherein the data access request comprises the address information of the web page;
        parsing the address information to obtain a domain name of the web page;
        searching the mobile device for the data corresponding to the domain name of the web page and the key;
        reading the data from the shared storage space corresponding to the web page on the mobile device based on the data access request; and
        sending, by the web browser, the data to the second application.

11. The computer-implemented system of claim 10, wherein the shared storage space is a cookie entry on the mobile device that is generated by the web server.

12. The computer-implemented system of claim 10, wherein storing the data at the shared storage space on the mobile device comprises one or more instructions to:
    send, from the web browser, the data writing request to the web server so that the web server writes the data into the web page corresponding to the address information of the web page, wherein the web page is generated by the web server;
    receive an instruction message from the web server;

parse the address information of the web page to obtain a domain name of the web page;
determine a cookie entry corresponding to the web page on the mobile device based on the domain name of the web page; and
write the data to the cookie entry.

13. The computer-implemented system of claim 10, wherein reading the data from the shared storage space comprises one or more instructions to:
parse the address information of the web page to obtain a domain name of the web page;
search the mobile device for a cookie entry corresponding to the web page based on the domain name of the web page; and
read the data from the cookie entry.

14. The computer-implemented system of claim 10, further comprising one or more instructions to:
determine, by the web server, a plurality of cookie entries based on a domain name of the web page;
assign a unique key to each cookie entry so that the cookie entries are stored in a key-value pair form;
receive a data writing request from the web browser; and
instruct the web browser to write data to a cookie entry by indicating a key of a cookie entry to be written.

* * * * *